US006555206B1

(12) United States Patent
Hann et al.

(10) Patent No.: US 6,555,206 B1
(45) Date of Patent: Apr. 29, 2003

(54) RECEIVER SHEET

(75) Inventors: Richard Anthony Hann, Ipswich (GB); Paul Andrew Edwards, Suffolk (GB); Mark Pett, Norfolk (GB); Godfrey William Moore, Manningtree (GB); Gary Wayne Morrison, London (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/600,709

(22) PCT Filed: Jan. 14, 1999

(86) PCT No.: PCT/GB99/00118

§ 371 (c)(1),
(2), (4) Date: Nov. 8, 2000

(87) PCT Pub. No.: WO99/36833

PCT Pub. Date: Jul. 22, 1999

(30) Foreign Application Priority Data

Jan. 14, 1998 (GB) .......................................... 9800608

(51) Int. Cl.[7] .......................... B32B 27/00; B32B 3/00

(52) U.S. Cl. ...................... 428/195; 428/206; 428/323; 428/327; 428/331; 428/339; 428/404; 428/407; 428/304.4

(58) Field of Search ............................ 428/195, 304.4, 428/327, 331, 206, 404, 407, 339, 323; 430/18

(56) References Cited

U.S. PATENT DOCUMENTS

| | | | | |
|---|---|---|---|---|
| 3,804,508 A | * | 4/1974 | Mihajlov et al. | 355/3 |
| 5,130,189 A | * | 7/1992 | Hart | 428/331 |
| 5,229,352 A | * | 7/1993 | Beck et al. | 503/227 |
| 5,254,426 A | | 10/1993 | Aslam et al. | |
| 5,827,627 A | * | 10/1998 | Cleckner et al. | 430/18 |
| 5,948,534 A | * | 9/1999 | Altavilla | 428/423.7 |

FOREIGN PATENT DOCUMENTS

| | | |
|---|---|---|
| EP | 0 408 197 | 1/1991 |
| EP | 0 457 458 | 11/1991 |

OTHER PUBLICATIONS

H.D.Junge: "parat index of polymer trade names" 1987, VCH Verlagsgesellschaft, Weinheim DE XP0002100876, see p. 341, col. 2, line 6–line 7 No Month.

Database WPI, Section Ch, Week 9343 Derwent Publication Ltd., London, GB; Class A89, AN 93–342985 XP002100877 AGFA–GEVAERT NV: "Dye donor and dye receiving elements for thermal transfer—comprises thin support coated on one side with dye/binder layer which releases printing dye in varying amts." A see abstract & Research Disclosure, vol. 353, No. 041, Sep. 10, 1993, Emsworth, GB.

* cited by examiner

*Primary Examiner*—Deborah Jones
*Assistant Examiner*—Ling Xu
(74) *Attorney, Agent, or Firm*—Pillsbury Winthrop LLP

(57) ABSTRACT

A transparent receiver sheet adapted to receive a color toner image by an electrophotographic or electrostatic process and suitable for use in an overhead projector, comprises a toner acceptance layer that comprises a resin condensation product of toluene sulphonamide. The resin is conveniently a condensation product of toluene sulphonamide and formaldehyde. One or more secondary polymers are preferably included in an amount in the range 0–60% weight.

17 Claims, No Drawings

RECEIVER SHEET

FIELD OF THE INVENTION

This invention concerns receiver sheets, particularly transparent receiver sheets adapted to receive a colour toner image by an electrophotographic or electrostatic process and suitable for use in an overhead projector (OHP).

BACKGROUND TO THE INVENTION

Overhead projectors project an image by passage of light through a transparent film, known as a receiver sheet, bearing the image to be projected. The image is formed or the film by electrophotography or electrostatic printing. The receiver sheet is placed into an electrophotographic or electrostatic printer or copier and toner (black for a black and white image, or a series of colour toners (CMYK (cyan, magenta, yellow, black)) for a full colour image) is deposited imagewise and fused into the receiver surface to form an image on the receiver sheet.

For black and white OHP purposes, OHP receiver sheets are usually in the form of polyester such as biaxially oriented poly(ethylene terephthalate) (PET) base film typically about 100 $\mu$m thick (eg Melinex (Melinex is a Trade Mark) from ICI/Dupont) with a coating on the surface to promote adhesion of the toner to the base film. The coating is typically of an acrilic polymer and is either applied during the manufacture of the PET film or is coated off-line, i.e. as a separate step. The coating usually also contains filler to improve the handling properties and some Aintistatic agent (sometimes applied as an extra coating known as a supercoat). Such materials work well in black and white OHPs, where the aim of the toner is simply to block out projected light and hence project a dark area. Different considerations apply, however, in projecting colour images on an OPP. In this case light must be transmitted through a coloured block and accurately transmit the correct spectrum of light onto a screen. This must be achieved with minimum loss due to light scatter. It is therefore necessary for the coloured block on the film to be as transparent as possible. If the toner particles stick to the OHP surface and remain proud of the surface, there will be a haze in the film and scattering of the light at the surface of the film. This will cause the projected image on the screen to look dull and rather grey.

If conventional black and white OHP receiver sheets are used for colour OHPs, poor results are obtained. The present invention aims to provide a novel receiver sheet better suited to use with colour OHPs.

SUMMARY OF THE INVENTION

According to the present invention there is provided a transparent receiver sheet adapted to receive a colour toner image by an electrophotographic or electrostatic process and suitable for use in an overhead projector, comprising a toner acceptance layer that comprises a resin condensation product of toluene sulphonamide.

The resin is conveniently a condensation product of toluene sulphonamide and formaldehyde.

The resin suitably has a melting point of at least 60° C.

Suitable resins may be made by known techniques, or are available commercially. One preferred commercially available resin is Ketjenflex MH (Ketjenflex MH is a Trade Mark) from Akzo, which has as its main functional component a resin condensation product of toluene sulphonamide and formaldehyde present in the form of a mixture of mainly dimer, trimer and tetramers. Ketjenflex MH has the desirable properties of being compatible with a wide range of polymer classes (which is of importance for reasons to be discussed below), having a low melting point (about 62° C.) which is very sharp, and having a low melt viscosity. Ketjenflex MH has a glass transition temperature (Tg) of 40° C.

The resin preferably constitutes an amount in the range 40 to 100% by weight of the weight of the toner acceptance layer.

The toner acceptance layer optionally includes one or more secondary polymers, typically in an amount in the range of 0 to 60% by weight of the weight of the toner acceptance layer. The secondary polymer preferably has a molecular weight as low as possible compatible with good film-forming properties, with the molecular weight typically being in the range 1000 to 20000. Low molecular weight is also important in reducing the melt viscosity to a value that allows easy penetration of toner, in use. The lower the molecular weight of the secondary polymer, the better the fusion performance as discussed below. However, low molecular weight polymers may present manufacturing difficulties, so a compromise balance should be reached. The secondary polymer is preferably selected for compatibility with the resin and with the toner with which the sheet is intended for use. Thus, the secondary polymer desirably has a melting point that is similar to or slightly higher than that of the resin. The secondary polymer advantageously has a chemical structure and/or chemical properties and/or solubility parameters similar to those of the toner to ensure compatibility on blending. Compatibility between secondary polymer, resin and toner is also important to reduce light scattering as far as possible. Further, the melting point of the secondary polymer is desirably sufficiently low to ensure efficient fusing of toner particles into the surface of the toner acceptance layer in use.

The secondary polymer desirably has a Tg below 60° C.

For good performance in use, a number of factors need to be controlled, as follows:

a/ Compatibility

The polymers/resins in the acceptance layer must be compatible with polymer in the toner particles. This can be controlled by using materials with similar chemical properties and/or similar solubility parameters. Compatibility can be improved with the use of low molecular weight resins/polymers.

b/ Melting Point

For the fusing of the compatible materials, the melting point of the toner acceptance layer must be similar to or slightly lower than that of the toner. The temperature that the toner is exposed to during production of an image is above its melting point, which allows it to adhere to the receiver sheet. If both the toner acceptance layer and the toner melt at the same time, they have the possibility of mixing and forming a coherent fused layer.

c/ Melt Viscosity

For the toner acceptance layer and toner particles to become fused into one layer, the two must be able to mix rapidly. To ensure this occurs, the melt viscosity of the acceptance layer must below. However, if the melt viscosity is too low or if the melting range of the acceptance layer is smooth, rather than sharp, then there is a possibility that the toner particles can spread too far and produce a blurred image. The acceptance layer should therefore have a low melt viscosity but with a sharp melting point.

While a toner acceptance layer comprising resin alone functions well in use providing the electrical characteristics are sufficient to accept charged toner, secondary polymer is preferably included to facilitate manufacture and improve the handling properties of the layer.

Good results have been obtained using secondary polymer selected from the following.

(a) Vinyl chloride/vinyl acetate (VC/VA) copolymer, eg Vinylite VYES-4 (Vinylite VYES-4 is a Trade Mark) from Union Carbide.

(b) Polyesters, eg Vylon 200 (Vylon 200 is a Trade Mark) from Toyobo, and the amorphous polyesters Dynapol 850, Dynapol 411 and Dynapol 206 (Dynapol is a Trade Mark) from Allchem/Huls.

(c) Fumarate polymers, eg Atlac 363E (Atlac 363E is a Trade Mark) from DSM Resins, which is a propoxylated bisphenol A fumarate polymer, with unsaturation on the fumarate ester group still present.

(d) Epoxy resin, eg Epikote (Epikote is a Trade Mark) from Shell, which is a bisphenol A epoxide.

(e) Acrylates, eg quarternised acrylates such as Surcol 860 and Surcol SP6 (Surcol ia a Trade Mark) from Ciba Speciality Chemicals.

It is expected that similar results would be obtained with a wide range of other secondary polymers including polymers including polyurethanes and polystyrenes.

Mixtures of secondary polymers may be used.

The toner acceptance layer desirably also includes a minor amount of particulate filler material, typically constituting an amount in the range 0.01 to 2% by weight of the weight of the toner acceptance layer. Inclusion of filler material gives the sheet a degree of surface roughness and prevents the surface of the sheet from being so smooth that it adheres to other smooth surfaces such as another similar sheet or a fuser roller. The particulate filler material conveniently has a particle size in the range 1 to 8 μm, preferably 1 to 5 μm, and may be of materials such as silica, particularly porous silica, polyethylene, or resin such as urea-formaldehyde resin. Good results have been obtained using, as filler materials, Syloid 244 (Syloid 244 is a Trade Mark) from Grace, which is a high porosity synthetic silica milled to a particle size of about 2 μm, Pergopak M3 (Pergopak M3 is a Trade Mark) from Omya Croxton and Gary, which is a milled urea-formaldehyde resin material with a particle size of about 3 μm, and MMP635F polythylene filler (MMP635F is a Trade Mark) from Micro Powders Inc. Mixtures of filler materials may be used.

It is found in practice that certain polymeric filler materials, including polyethylene fillers, may melt during the printing process so that the printed sheet no longer has a surface roughness. This is advantageous, as surface roughness would otherwise cause undesirable haze.

The toner acceptance layer desirably includes one or more anti-static materials with the aim of avoiding the need to use a supercoat. Suitable anti-static materials include one or more of lithium hydroxide and toluenesulphonic acid. Lithum ions provide both humectant properties and ionic conductivity. Diethylene glycol may also be included to assist these functions. Other anti-static materials include quarternised acrylates, nonyl phenol ethoxylate, sodium alkyl sulphonate and stearamide propyl methyl β-hydroxy ethyl ammonium di-hydrogen phosphate.

Flow agents such as silicones or acrylic ester polymers may optionally be included, particularly in conjunction with anti-static materials, to improve performance.

A supercoat may be provided in known manner on the toner acceptance layer if appropriate, eg to modify the surface conductivity.

The receiver sheet typically further comprises a base sheet of transparent material, usually plastics material, carrying the toner acceptance layer. The base sheet is conveniently made of polyester, eg poly(ethyleneterephthalate) (PET) such as Melinex or poly(ethylenenaphthalate) (PEN). The base sheet may alternatively be of polycarbonate. The base sheet typically has a thickness in the range 50 to 150 μm, eg about 100 μm. The base sheet may be pre-treated with an adhesion-promoting priming layer, eg of parachlorometa-cresol (PCMC), prior to application of the toner acceptance layer.

The receiver sheet will typically include one or more opaque portions for location by a photoelectric detector of a printer to facilitate correct feeding of the sheet, in known manner. Such an opaque portion may be produced by a pigmented or scattering stripe along one or more edges. Alternatively a strip of plain paper may be temporarily laminated behind the receiver sheet.

Typical examples of toner acceptance layer formulations are as follows, expressed in terms of parts by weight. Filler is expressed as wt % based on the total weight of polymers (resin and secondary polymer).

1/

Ketjenflex MH 50 parts. Range (40–100 parts) Preferred range (50–80 parts)

Vinylite VYES-4 50 parts. Range (0–60 parts) Preferred range (20–50 parts)

Pergopak M3 filler 0.3 parts on polymers. Range (0.01–2 parts) Preferred range (0.1–0.6 parts)

2/

Ketjenflex MH 85 parts. Range (70–100 parts) Preferred range (80–95 parts)

Vylon 200 15 parts. Range (0–30 parts) Preferred range (5–20 parts)

Pergopak M3. 0.3 parts on polymers. Range (0.01–2 parts) Preferred range (0.1–0.6 parts)

3/

Ketjenflex MH 70 parts. Range (40–100 parts) Preferred range (50–90 parts)

Atlac 363E 30 parts. Range (0–60 parts) Preferred range (10–50 parts)

Pergopak M3. 0.3 parts on polymers. Range (0.01–2 parts) Preferred range (0.1–0.6 parts)

4/

Sample formations including anti-static materials are as follows:

Vinylite VYES-4 20–70 parts (Preferably 30–50)

Ketjenflex MH 80–30 parts (Preferably 70–50)

Pergopak M3. 0.05–1 part (Preferably 0.1–0.6)

Digol (Diethylene Glycol). 3–20 parts (Preferably 5–15)

Toluene 4 Sulphonic acid. 3–20 parts (Preferably 5–15)

Lithium Hydroxide. 1–6 parts (Preferably 2–4)

In all cases, Pergopak filler can be replaced by a silica filler, such a Syloid 244. etc.

The toner acceptance layer ingredients are usually dissolved in a suitable solvent or solvent system (mixture of solvents) which can be any solvent or mixture of solvents that dissolve the materials and that is compatible with the other materials involved and coating technique used.

Suitable solvents include one or more of methanol, n-butanol, methyl ethyl ketone, acetone and toluene. A suitable solvent system for all the above formulations is 10 parts by weight methanol/90 parts by weight acetone.

Currently favoured formulations comprise Ketjenflex MH and amorphous polyester (Dynapol L411), typically at a weight ratio in the range 3:1 to 1.1, preferably 1.5:1. The preferred solvent system for such formulations comprises a mixture of acetone and methyl ethyl ketone, possibly with a small amount of toluene. The preferred anti-static material in such formulations is Atmer 190 (20% solution) and/or Alcosist PN, with the preferred filler material being Pergopak M3.

The receiver sheet may be produced by coating, eg by a roller coating technique, a solution of the toner acceptance layer ingredients, ie resin, optional secondary polymer, filler, anti-static materials etc, dissolved in a suitable solvent system, eg 10 parts by weight methanol/90 parts by weight acetone, onto a base sheet possibly pretreated with an adhesion-promoting priming layer, eg of PCMC, followed by drying to produce the toner acceptance layer. A supercoat may be optionally provided on the toner acceptance layer. An opaque location portion may be included along one or more edges.

In a further aspect the invention thus provides a method of manufacturing a transparent receiver sheet adapted to receive a colour toner image by an electrophotographic or electrostatic process and suitable for use in an overhead projector, comprising providing on a base sheet of transparent material a toner acceptance layer that comprises a resin condensation product of toluene sulphonamide.

The receiver sheet may be used in conventional manner to receive a colour image for use in an OHP. This generally involves transferring colour toner particles to the toner acceptance layer, eg using a colour xerographic copier or printer in a process that typically involves passing the receiver sheet through heated rollers to fuse the toner particles to each other and to ensure firm attachment to the receiver sheet. Silicone oil is typically used as a lubricant to ensure that the toner particles do not adhere to the heated rollers.

In another aspect the invention thus provides a method of producing a sheet for projection of colour images by an overhead projector, comprising forming a colour toner image on a receiver sheet in accordance with the invention.

It is found that with receiver sheets in accordance with the invention, the properties of the resin can provide good compatibility with toner particles in current use, such that the toner particles fuse into the toner acceptance layer, resulting in transparent colour blocks with low haze and good clarity. When used in an OHP, projected images that are bright in colour can be obtained from such sheets. The good compatibility of the acceptance layer with the toner particles gives good projected optical densities A secondary benefit is good toner adhesion, which is of importance to end users when assessing receiver sheets and handling OHPs.

The invention will be further described, by way of illustration, in the following Examples.

EXAMPLE 1

A series of receiver sheets was produced as experimental prototypes by mixing toner acceptance layer ingredients as specified below and in each case additionally including Pergopak M3 filler in an amount of 0.4% by weight of the total solids, and dissolving the ingredients at 10% solids in a solvent mixture of 10 parts by weight methanol/90 parts by weight acetone. The resulting solutions were hand coated using a number 5 Meier bar onto 100 μm Melinex grade polyester sheet, pre-treated with an adhesion-promoting PCMC priming layer. (The PCMC prime consists of a coating of a dilute solution of parachlorometacresol optionally mixed with some of the polymer used for the main coating, eg 1.5% PCMC and 1.5% Epikote 1007 in acetone, using a number 4 Meier bar, followed by heating at 100° C. for 1 minute.) The sheets were dried in an oven at 70° C. for 120 seconds. The resulting coatings were 3.1 μm thick, after solvent evaporation. The sheets were temporarily laminated with a narrow strip of plain paper on a major edge, for location purposes, trimmed to A4 size and fed into a Kodak 1560 (Kodak is a Trade Mark) colour copier using colour toner supplied for that copier in order to copy a test pattern.

The sheets were tested by measuring haze in yellow and cyan copy areas, using a EEL hazemeter. OHP projection brightness comparisons were made by visual inspection of the projected image. For comparison purposes, similar tests are made on commercially available OHP receiver sheets, ICI EP 112, Canon CT 700 and Arkwright CM grade (Xerox, USA). Results are as follows.

Haze Assessment

| Material | Yellow Haze % | Cyan Haze % |
|---|---|---|
| Arkwright film (Competitor) | 26.3 | 36.0 |
| Canon film Competitor) | 17.9 | 26.6 |
| ICI (Current b/w copier) | 40.7 | 45.8 |
| 100% Ketjenflex | 13.4 | 28.8 |
| 75% Ketjenflex: 25% VYES | 13.9 | 31.6 |
| 50% Ketjenflex: 50% VYES | 19.0 | 33.0 |
| 25% Ketjenflex: 75% VYES | 31.6 | 34.9 |
| 100% VYES | 41.7 | 43.4 |
| 75% Ketjenflex: 25% Vylon 200 | 30.8 | 38.0 |
| 50% Ketjenflex: 50% Vylon 200 | 41.9 | 39.8 |
| 25% Ketjenflex: 75% Vylon 200 | 41.5 | 43.2 |
| 100% Vylon 200 | 42.4 | 42.7 |
| 75% Ketjenflex: 25% Atlac 363E | 15.3 | 32.3 |
| 50% Ketjenflex: 50% Atlac 363E | 26.6 | 31.2 |
| 25% Ketjenflex: 75% Atlac 363E | 34.7 | 40.2 |
| 100% Atlac 363E | 38.9 | 43.7 |

Because the most obvious shortcoming caused by scattering is in the yellow portions of the OHP, which tend to become brown in appearance, the yellow haze (measured with blue light) is the best indicator of performance. The above results, re-ordered on the basis of yellow haze and thus giving an indication of order of performance, are as follows:

| Material | Yellow Haze % | Cyan Haze % |
|---|---|---|
| 100% Ketjenflex | 13.4 | 28.8 |
| 75% Ketjenflex: 25% VYES | 13.9 | 31.6 |
| 75% Ketjenflex: 25% Atlac 363E | 15.3 | 32.3 |
| Canon film (Competitor) | 17.9 | 26.6 |
| 50% Ketjenflex: 50% VYES | 19.0 | 33.0 |
| Arkwright film (Competitor) | 26.3 | 36.0 |
| 5% Ketjenflex: 50% Atlac 363E | 26.6 | 31.2 |
| 75% Ketjenflex: 25% Vylon 200 | 30.8 | 38.0 |
| 25% Ketjenflex: 75% VYES | 31.6 | 34.9 |
| 25% Ketjenflex: 75% Atlac 363E | 34.7 | 40.2 |
| 100% Atlac 363E | 38.9 | 43.7 |
| ICI (Current b/w copier) | 40.7 | 45.8 |
| 25% Ketjenflex: 75% Vylon 200 | 41.5 | 43.2 |
| 100% VYES | 41.7 | 43.4 |
| 50% Ketjenflex: 50% Vylon 200 | 41.9 | 39.8 |
| 100% Vylon 200 | 42.4 | 42.7 |

OHP Projection Brightness Comparisons

Visual assessment could not be quantified, but was in broad agreement with the above measurements.

EXAMPLE 2

A further series of receiver sheets was produced generally as described in Example 1, using mixtures of Ketjenfiex MH with Epikote 1007 epoxy resin to act as the toner acceptance layer. In this case the solvent used was methyl ethyl ketone (MEK) (butan-2-one), with formulations made at 10% total solids in MEK. As before, Pergopak M3 filler was used at 0.4% solids Results are as follows:

Haze Assessment

| Formulation | % Haze yellow | % Haze cyan |
|---|---|---|
| 100% Ketjenflex | 17.7 | 33.2 |
| 75% Ketjenflex/25% Epikote | 25.1 | 38.6 |
| 50% Ketjenflex/50% Epikote | 39.1 | 45.5 |
| 25% Ketjenflex/75% Epikote | 41.7 | 49.4 |
| 100% Epikote | 43.2 | 50.7 |
| Arkwright standard | 26.1 | 40.9 |
| Canon standard | 25.7 | 38.3 |
| ICI Current b/w product | 40.9 | 38.3 |

EXAMPLE 3

A further series of receiver sheets was produced and tested generally as described in Example 1, although there were a number of minor differences as follows:

1. No PCMC priming layer was used.
2. A 3K Meier bar was used for hand coating. This gave wet coatings 24 $\mu$m thick and dry coatings 3.2 $\mu$m thick, after solvent evaporation.
3. The coatings were dried at 80° C.
4. Test prints were made using a Canon CLC 800 photocopier, using colour toner supplied for that copier.

Details of the materials used in this Example are given in the following table.

| Material | Composition | Supplier | Tg | M.Wt |
|---|---|---|---|---|
| Resin condensation product of toluene sulphonamide | | | | |
| Ketjenflex MH | Toluene sulphonamide formaldehyde resin | Akzo | 40 | N/A |
| Secondary polymers | | | | |
| Dynapol 850 | Amorphous polyester | Allchem/Huls | 40 | 15 k |
| Dynapol L411 | Amorphous polyester | Allchem/Huls | 47 | 16 k |
| Dynapol L206 | Amorphous polyester | Allchem/Huls | 67 | 20 k |
| Vinylite VYES-4 | VC/VA copolymer | Union Carbide | 53 | 5.5 k |
| Surcol 860 | Polyacrylate/acrylic acid | Ciba Speciality Chemicals | 62 | 10 k |
| Surcol SP6 | Quarternised acrylate | Ciba Speciality Chemicals | 53 | N/A |
| Anti-static materials | | | | |
| Alcostat 167 | Quarternised acrylate | Ciba Speciality Chemicals | N/A | N/A |

-continued

| Material | Composition | Supplier | Tg | M.Wt |
|---|---|---|---|---|
| Alcosist PN | Nonyl phenol ethoxylate | Ciba Speciality Chemicals | N/A | N/A |
| Cyastat SP35 | Stearamide proply methyl β-hydroxy ethyl ammonium di-hydrogen phosphate | Ciba Geigy | N/A | N/A |
| Atmer 190 | Sodium alkyl sulphonate | ICI Surfactants | N/A | N/A |
| Filler Materials | | | | |
| Pergopak M3 | Urea formaldehyde filler | Omya Ltd | N/A | N/A |
| MMP 635F | Polyethylene filler | Micro Powders Inc. | N/A | N/A |
| Flow Agent | | | | |
| Additol 490 | Acrylic acid ester polymer | Vianova Resins | N/A | N/A |

N/A = not available or not applicable

For comparison purposes, test prints were made using a Canon CLC 800 photocopier on commercially available OHP receiver sheets from ICI and Canon as used in Example 1, namely ICI EP 112 and Canon CT 700. Haze measurements were as follows:

| Sample | % Haze Yellow | Magenta | Cyan |
|---|---|---|---|
| Canon | 13.0 | 17.0 | 18.0 |
| ICI (E112) | 47.0 | 22.0 | 20.0 |

Details of the experimental formulations in accordance with the invention which were made and tested as described are given in the following tables, with performance data. In the tables the amounts of ingredients are given as parts by weight, with Ketjenflex MH, secondary polymer and solvent together constituting 100 parts by weight and additional ingredients such as filler material, anti-static material etc specified as parts by weight in addition. In sample 19, the toluene solvent is treated as an additional ingredient.

Note that samples 15 and 19 were produced by a machine roller coating process, while the rest of the samples were produced by the laboratory technique described in Example 1.

| Sample No | 1 | 2 | 3 | 4 | 5 | 6 | 7 | 8 |
|---|---|---|---|---|---|---|---|---|
| Dynapol 850 | | | 8.2 | | | | | |
| Dynapol L411 | | | | | 8.8 | 7 | 7 | 7 |
| Dynapol L206 | | | | | | | | |
| Vinylite VYES-4 | | | | 8.8 | | | | |
| Surcol 860 | 10.53 | | | | | | | |
| Surcol SP6 | | 37.3 | | | | | | |
| Ketjenflex MH | 36.84 | 28.4 | 14.1 | 15.2 | 15.2 | 13 | 13 | 13 |
| Cyastat SP35 | 15 | 15 | | | | | | |
| Additol 490 | | | | | | 0.5 | | |
| Alcosist PN | | | | | | | 2 | 2 |

-continued

| | | | | | | | | |
|---|---|---|---|---|---|---|---|---|
| Atmer 190 (20% solution) | | | 1.2 | 1.26 | 0.63 | 0.5 | 0.5 | |
| MMP 635F | | | | | | 0.05 | | |
| Pergopak M3 | 0.158 | 0.158 | 0.07 | 0.06 | 0.06 | | 0.05 | 0.05 |
| Methanol | 52.63 | 34.3 | | | | | | |
| n-Butanol | | | 7.1 | | | | | |
| Methyl ethyl ketone | | | 70.6 | | 76 | 20 | 20 | 20 |
| Acetone | | | | 76 | | 60 | 60 | 60 |
| Yellow haze % | 21.0 | 29.9 | 12.1 | 10.8 | 15.6 | 10.8 | 10.8 | 9.8 |
| Magenta haze % | 19.0 | 19.8 | 15.8 | 15.1 | 19.3 | 15.6 | 13.9 | 14.7 |
| Cyan haze % | 17.0 | 17.8 | 14.5 | 12.2 | 16.5 | 13.0 | 11.9 | 12.0 |
| Feed | yes | yes | yes | yes | yes | yes | yes | Yes |
| Surface resistivity (ohms/square) | $10^{10}$ | $10^{9}$ | $10^{10}$ | $10^{10}$ | $10^{10}$ | $10^{13}$ | $10^{12}$ | $10^{13}$ |
| Toner Adhesion | | | Good | fair | | | v. good | v. good |
| Coat thickness (μm) | 3.2 | 3.2 | 3.2 | 3.2 | 3.2 | 3.2 | 3.2 | 3.2 |
| Coat Quality | | | Poor/Good | fair | v. good | v. good | v. good | v. good |
| Static pattern | no | no | no | no | no | slight | no | No |

| Sample No | 9 | 10 | 11 | 12 | 13 | 14 | 15 | 16 | 17 | 18 | 19 |
|---|---|---|---|---|---|---|---|---|---|---|---|
| Dynapol 850 | | | | | | | | | | | |
| Dynapol L411 | 8 | 9 | 8 | | 8 | 20 | 5 | 5.9 | 5.9 | 5.9 | 7 |
| Dynapol L206 | | | | 8 | | | | | | | |
| Ketjenflex MH | 12 | 11 | 12 | 12 | 12 | 30 | 10 | 11.6 | 11.6 | 11.6 | 10.5 |
| Alcosist PN | | | 1 | 1 | | | | | | 0.88 | 0.88 |
| Atmer 190 (20% solution) | 0.5 | 0.5 | | 0.5 | 0.5 | 1.25 | 0.375 | 0.44 | 0.44 | 0.44 | |
| Pergopak M3 | 0.025 | 0.025 | 0.037 | 0.037 | 0.037 | 0.088 | 0.044 | 0.022 | 0.022 | 0.022 | 0.046 |
| Toluene | | | | 3 | | | | | | | 3.3 |
| Methyl ethyl ketone | 20 | 8 | 8 | 8 | 12 | 12.5 | 85 | 41.25 | 20.6 | 20.6 | 8.25 |
| Acetone | 60 | 72 | 72 | 69 | 68 | 37.5 | | 41.25 | 62 | 62 | 74.25 |
| Yellow haze % | 10.7 | 19.0 | 9.1 | 19.0 | 13.1 | 12.4 | 15.7 | 15.6 | 11.2 | 10.8 | 9.00 |
| Magenta haze % | 17.7 | 21.1 | 15.0 | 22.0 | 17.9 | 18.8 | 17.4 | 19.3 | 15.9 | 13.9 | 14.00 |
| Cyan haze % | 16.3 | 19.7 | 16.8 | 21.0 | 17.6 | 18.6 | 16.9 | 16.5 | 13.2 | 11.9 | 14.00 |
| Feed | yes | Yes | yes | yes | yes | yes | yes | Yes | yes | yes | yes |
| Surface resistivity (ohms/square) | $10^{10}$ | $10^{10}$ | $10^{13}$ | $10^{13}$ | $10^{10}$ | $10^{10}$ | $10^{10}$ | $10^{10}$ | $10^{10}$ | $10^{13}$ | $10^{13}$ |
| Toner adhesion | Good | Good | Good | Good | Good | Good | Good | Good | Good | Good | Good |
| Coat thickness (μm) | 3.2 | 3.2 | 3.2 | 3.2 | 3.2 | 3.2 | 1.6 | 3.2 | 3.2 | 3.2 | 2.4 |
| Coat Quality | fair | Good | v. good | good | fair | fair | good | Good | v. good | v. good | Good |
| Static pattern | slight (mag) | No | no | no | no | no | no | No | no | no | No |

The static pattern mentioned in the results as being apparent or not refers to the presence of small spots in colour blocks which appear, especially in the magenta block, if the surface resistivity is higher than $10^{10}$ ohms/square.

Useful anti-static materials were Cyastat SP35 in the formulations using mainly methanol solvent, and Atmer 190 in acetone-based formulations. However, Alcosist PN, although it does not cause a low surface resistivity, changes the tribological properties of the coating in such a way that spurious electrostatic charges do not occur on the surface. This material, being an aromatic compound, also improves the toner fusability.

Formulations including MPP 635F, a polyethylene filler, produce products in which the filler particles disappear when the product passes through the fuser during the printing process. This has the advantage that the resulting print does not have surface roughness, so undesirable haze that would otherwise be caused thereby does not occur.

Sample number 19 is the currently favoured formulation. A variant of sample 19, with Alcosist PN replaced by Atmer 190 is also favoured.

What is claimed is:

1. An electrophotographically or electrostatically printable transparent receiver sheet adapted to receive a colour toner image by an electrophotographic or electrostatic process suitable for use in an overhead projector, comprising a toner acceptance layer that comprises a resin condensation product of toluene sulphonamide.

2. A receiver sheet according to claim 1, wherein the resin is a condensation product of toluene sulphonamide and formaldehyde.

3. A receiver sheet according to claim 1 or 2, wherein the resin has a melting point of at least 60° C.

4. A receiver sheet according to claim 1, wherein the resin comprises a resin condensation product of toluene sulphonamide and formaldehyde having a sharp melting point of about 62° C., a low melt viscosity and a glass transition temperature (Tg) of about 40° C.

5. A receiver sheet according to claim 1, wherein the resin constitutes an amount in the range 40 to 100% by weight of the weight of the toner acceptance layer.

6. A receiver sheet according to claim 1, wherein the toner acceptance layer includes one or more secondary polymers.

7. A receiver sheet according to claim 6, wherein the one or more secondary polymers are present in an amount up to 60% by weight of the weight of the toner acceptance layer.

8. A receiver sheet according to claim 6 or claim 7, wherein the secondary polymer is selected from vinyl chloride/vinyl acetate copolymers, polyesters, fumarate polymers, epoxy resins, acrylates, polyurethanes and polystyrenes.

9. A receiver sheet according to claim 1, wherein the toner acceptance layer further includes a particulate filler material.

10. A receiver sheet according to claim 9, wherein the filler material constitutes an amount in the range 0.01 to 2% by weight of the weight of the toner acceptance layer.

11. A receiver sheet according to claim 9 or claim 10, wherein the filler material is selected from silica, polyethylene or urea-formaldehyde resin.

12. A receiver sheet according to claim 9, wherein the filler material has a particle size in the range 1 to 8 $\mu$m.

13. A receiver sheet according to claim 1, wherein the toner acceptance layer includes one or more anti-static materials.

14. A receiver sheet according to claim 1, further comprising a base sheet of transparent plastics material carrying the toner acceptance layer.

15. A receiver sheet according to claim 14, wherein the base sheet is of polyester.

16. A receiver sheet according to claim 1, including one or more opaque portions locatable by a photoelectric detector.

17. A receiver sheet according to claim 9 or claim 10, wherein the filler material comprises porous silica.

* * * * *